Sept. 6, 1949.  W. B. MacDONALD, JR  2,481,230
VEHICLE TRAILER
Filed April 8, 1946  6 Sheets-Sheet 1
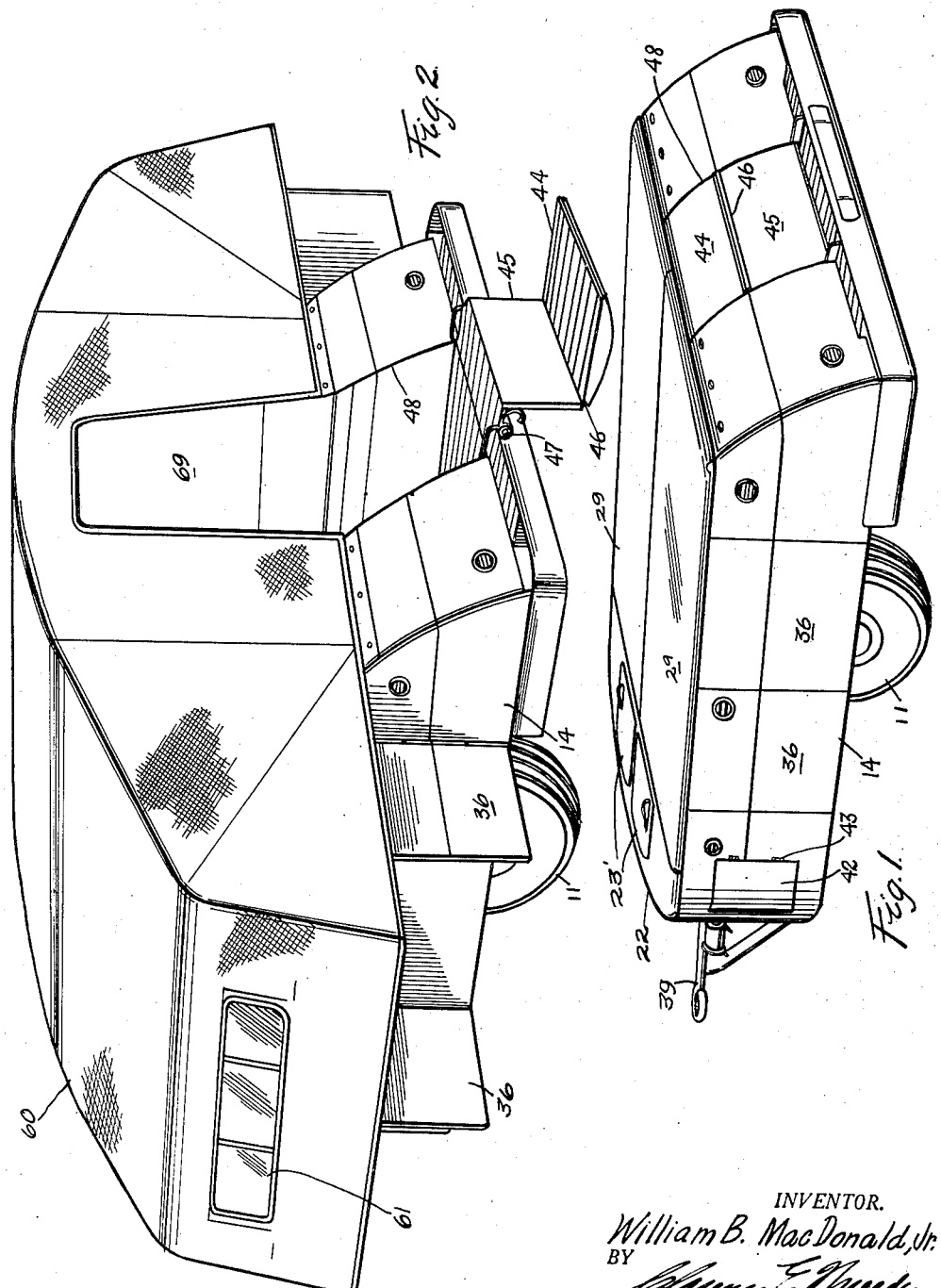
INVENTOR.
William B. MacDonald, Jr.
BY
His Attorney.

Sept. 6, 1949.　　　W. B. MacDONALD, JR　　　2,481,230
VEHICLE TRAILER
Filed April 8, 1946　　　　　　　　　　　　6 Sheets-Sheet 2

INVENTOR.
William B. MacDonald, Jr.
BY
His Attorney.

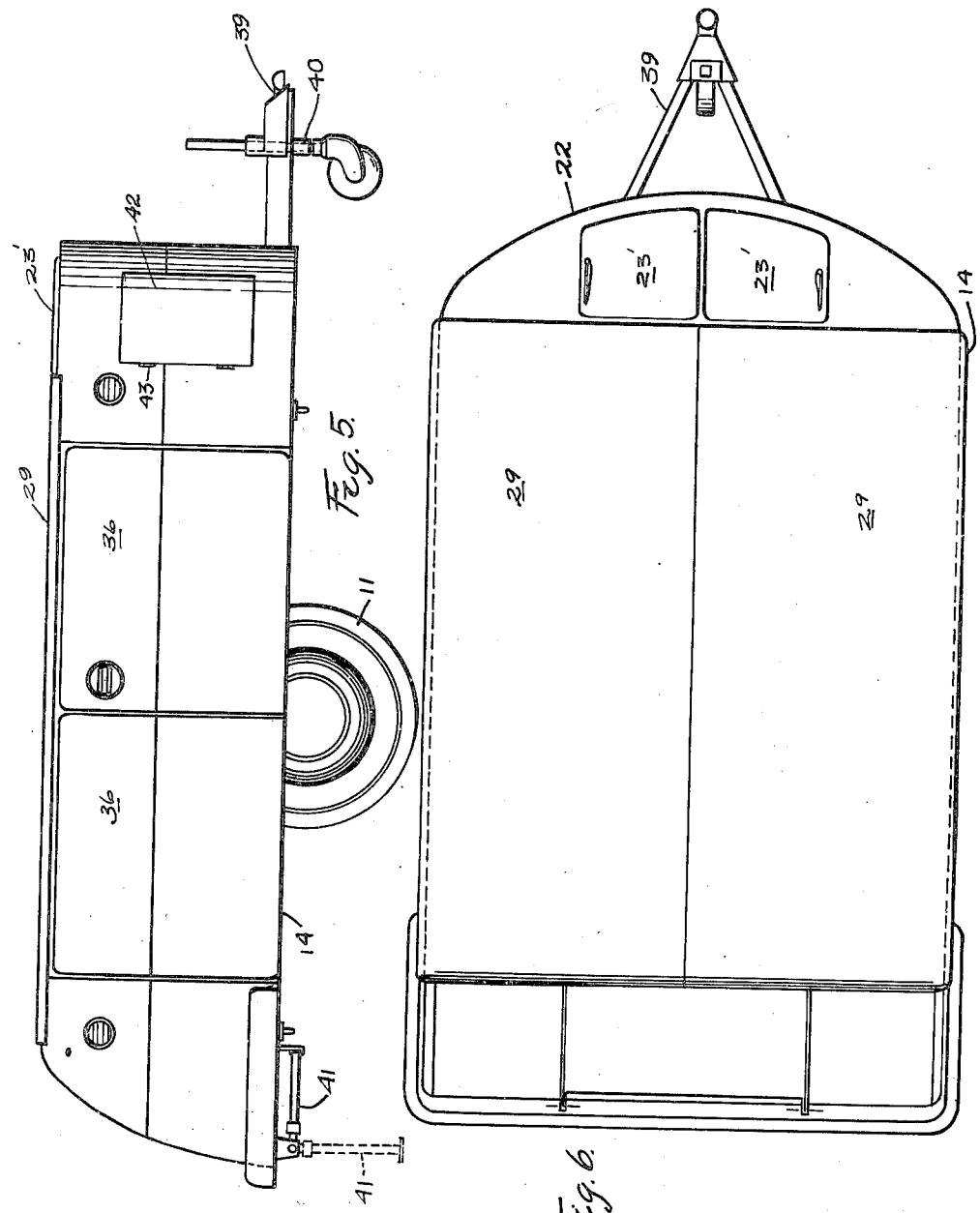

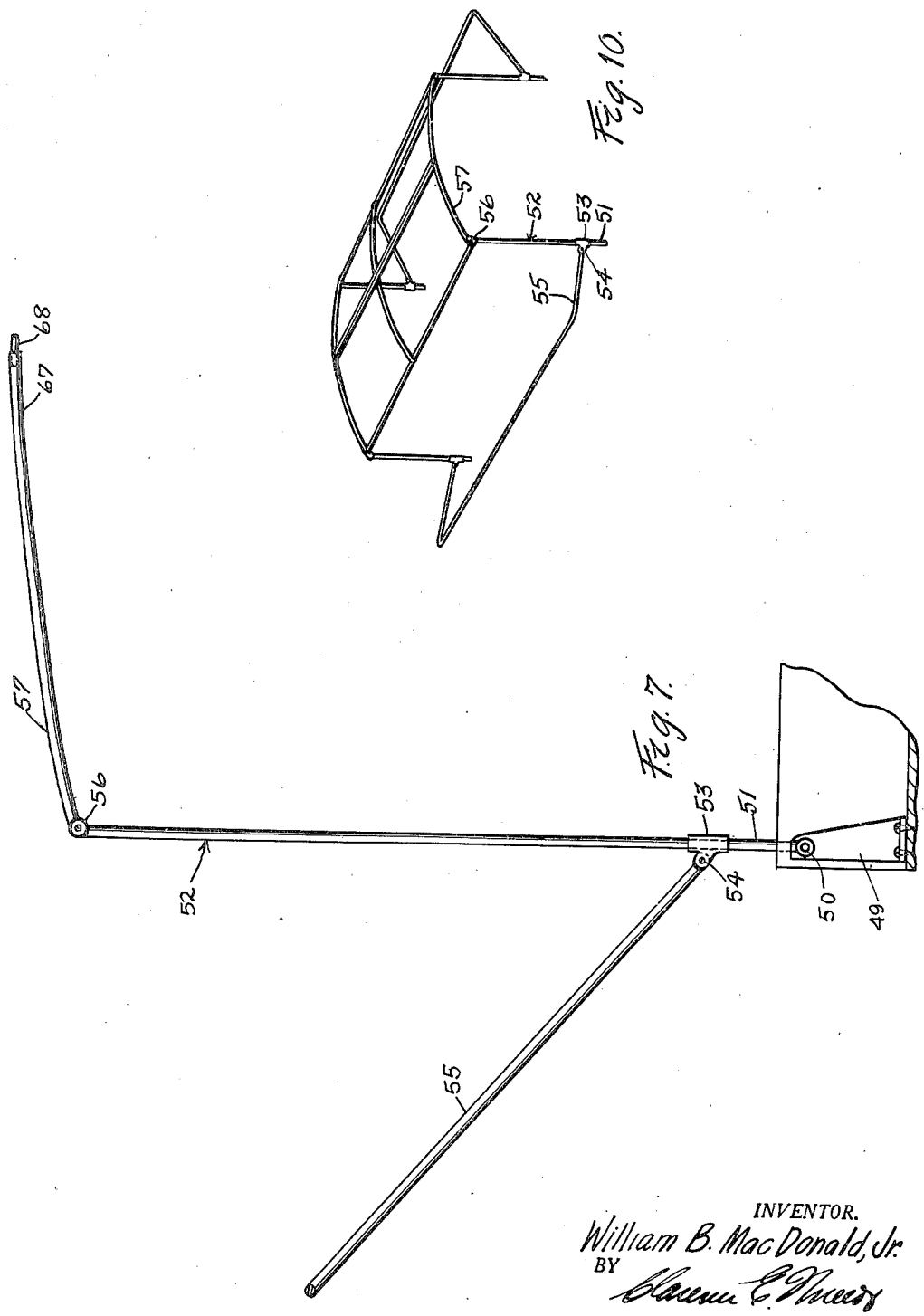

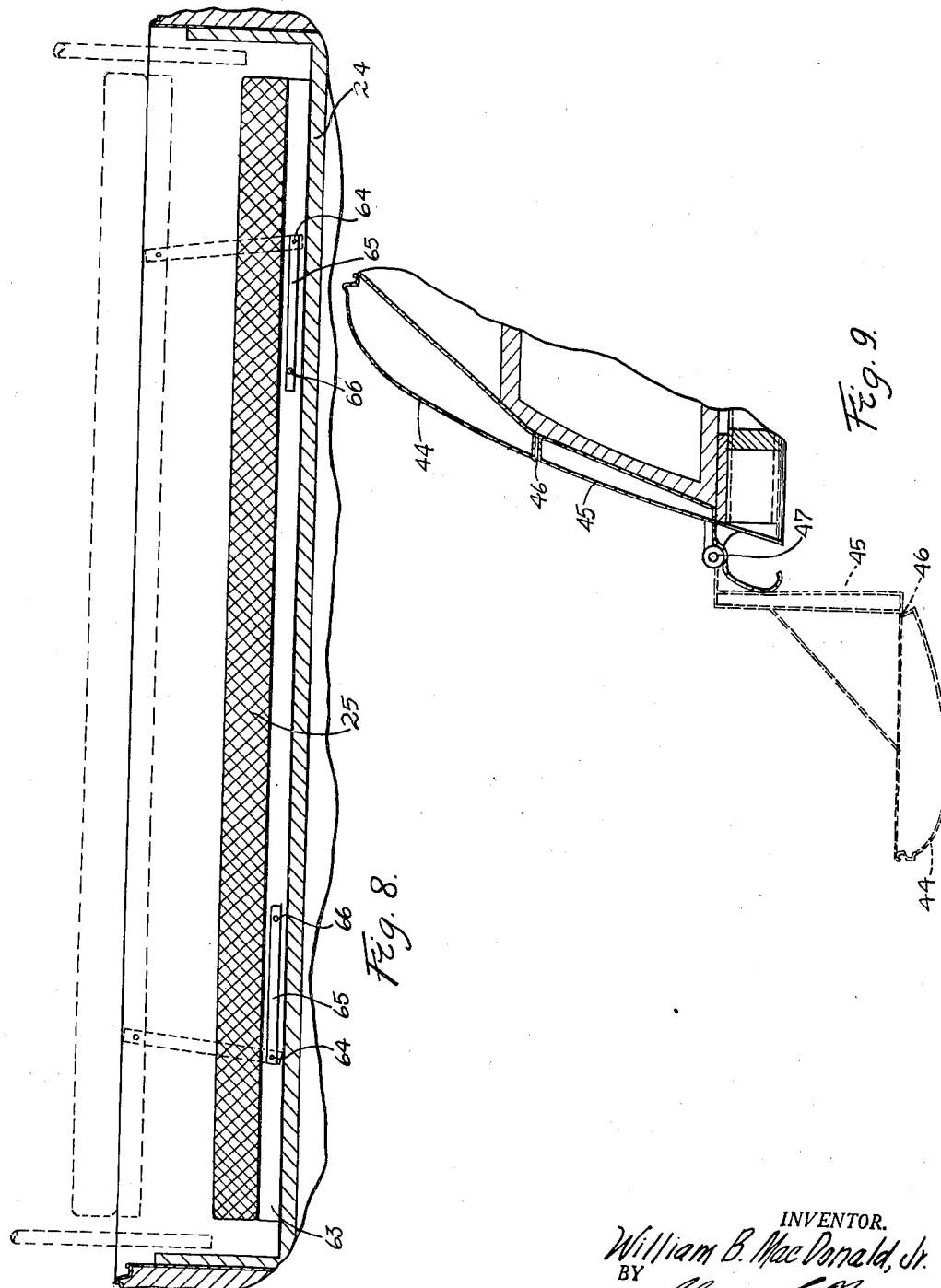

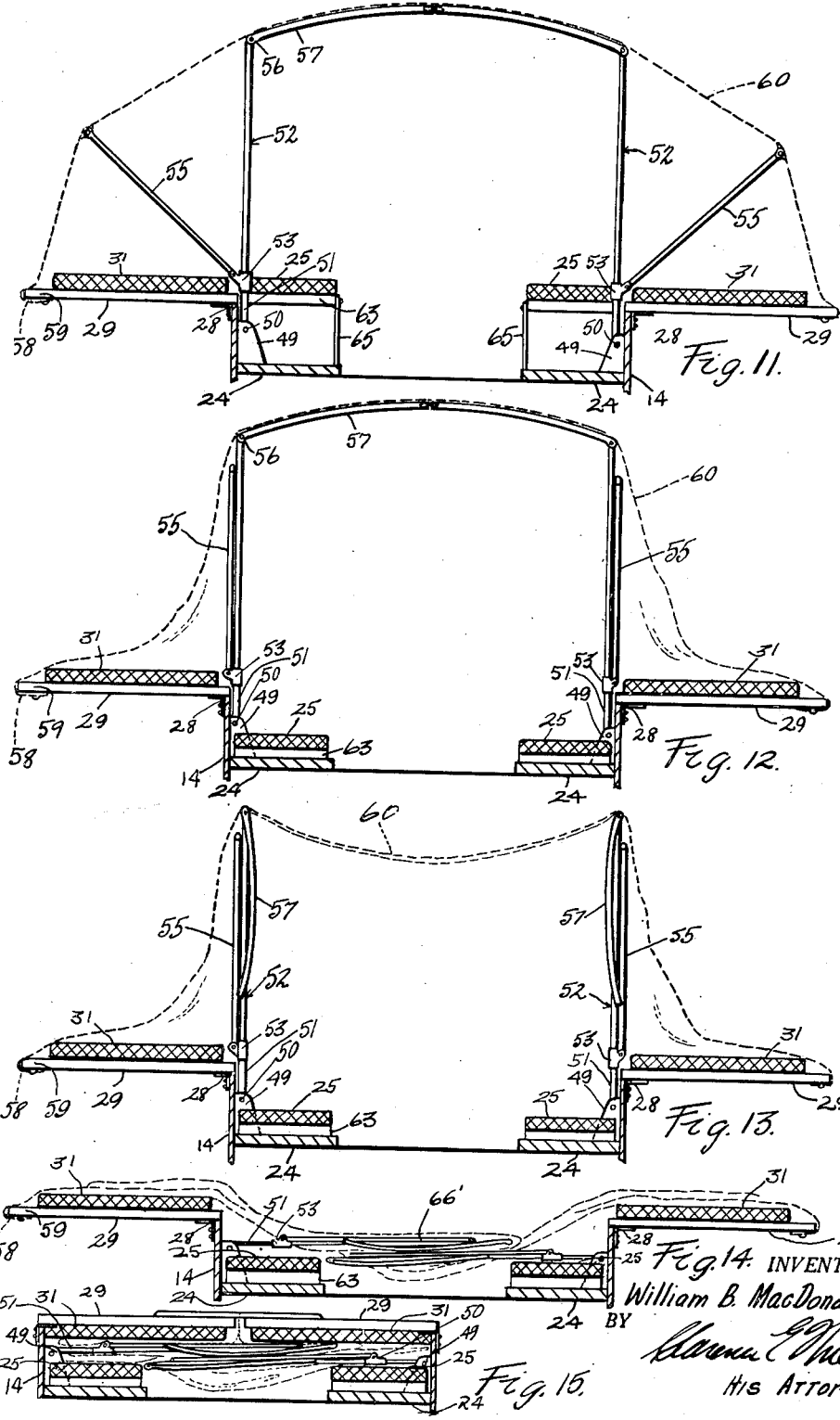

Patented Sept. 6, 1949

2,481,230

UNITED STATES PATENT OFFICE 2,481,230

VEHICLE TRAILER

William B. MacDonald, Jr., Chicago, Ill.

Application April 8, 1946, Serial No. 660,374

2 Claims. (Cl. 296—23)

This invention relates to certain new and useful improvements in vehicle trailers.

The invention relates to that class of trailers adapted to be towed at the rear by an automobile or other motor car, and particularly it relates to a small compact and easily transported type of trailer intended to serve as accommodation for over-night camping; a trailer which, when not serving for camping purposes, may be collapsed upon a wheel-bearing chassis into a small, compact and concealed unit for transportation about, fully protected from the elements and inclemencies of the weather.

One of the essential objects of the invention is bedding provision, it being the object of this invention to provide, for sleeping accommodations on each long side of the trailer, a foldable mattress, one section of which may be used as a cushion for seating purposes and capable of being elevated to a plane coincidental with the plane of the other section of the mattress, whereby to constitute the completed mattress for sleeping accommodations.

Yet another and equally important object of the invention is the collapsibility of the trailer, it being an object to provide a superstructure capable of being collapsed with the least amount of exertion on the part of the operator or user, to confine that part of the trailer in a small, compact and concealed unit during transportation.

Another object of the invention is the provision in a trailer of the character hereinafter described which will afford a maximum amount of storage space commensurate with the size of the trailer.

Our improved trailer consists of a simple number of parts arranged so that it can be easily and quickly converted from and into form for camping purposes and its parts are readily folded and stored in compact form within the body, protected from inclement weather and dust while thus stored, it being an object of the invention to provide a trailer which will withstand the usual rough usage to which trailers of this type are subjected.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the trailer embodying my invention, showing the same in collapsed condition ready for transportation;

Fig. 2 is a perspective view of the trailer in distended position ready for camping facilities;

Fig. 5 is a typical side elevational view of the same;

Fig. 6 is a plan view of the same;

Fig. 7 is an elevational view of certain supporting frames embodied in the invention;

Fig. 8 is a detail view of a bed construction embodied in the invention;

Fig. 9 is a detail view of the tail gate embodied in the invention;

Fig. 10 is a perspective view of the supporting frame embodied in the invention;

Figure 3:
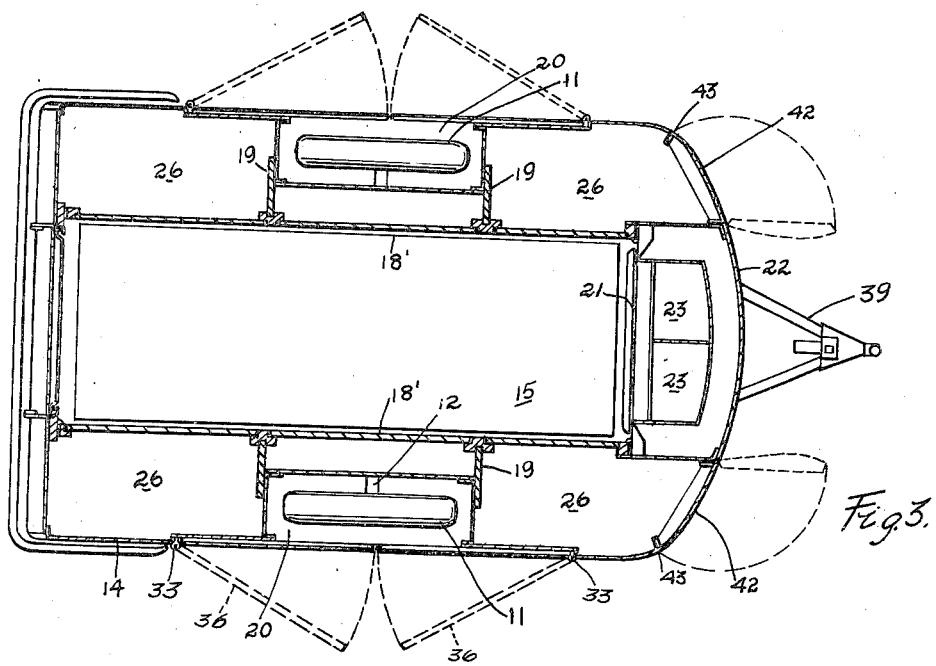
Fig. 3 is a horizontal sectional detail view of the same.

Figs. 11 to 15 inclusive are schematic illustrations of the manner of collapsing the trailer cover.

The several objects of this invention are accomplished by the preferred form of construction as shown in the accompanying drawings. In this connection a wheel-bearing chassis is indicated at 10, the wheels being indicated at 11 and the axle therefor at 12. This chassis structure may be of any approved construction or design including the chassis side bars 13 which support the trailer body or cabinet 14. This cabinet 14 comprises a floor 15 consisting of two sections 16 arranged in parallel relation with respect to each other and hinged as at 17 to side plates 18. Within this cabinet 14 are vertical partitions 18' which provide, together with other partitions 19, recesses 20 for the projection of the upper portion of the wheels 11. A cross partition 21 provides, together with exterior end partitions 22, adjacent storage compartments 23 for the confinement of ice for refrigeration purposes. Extending on each side of the cabinet 14 are horizontal planks 24 which provide, together with a mattress section 25, a seat extending longitudinally of the cabinet. On opposite sides of the recesses 20 are storage compartments 26, access to which may be had by suitable hinged doors 27.

Hinged to the upper end portion of each of the side walls of the cabinet 14 as at 28, are side panels or cover sections 29, the meeting edges of which are rabbeted to prevent entrance of dust or elements of the weather. On the underside of these cover sections 29 are secured mattresses 31, this being done in any suitable manner.

Figure 4:
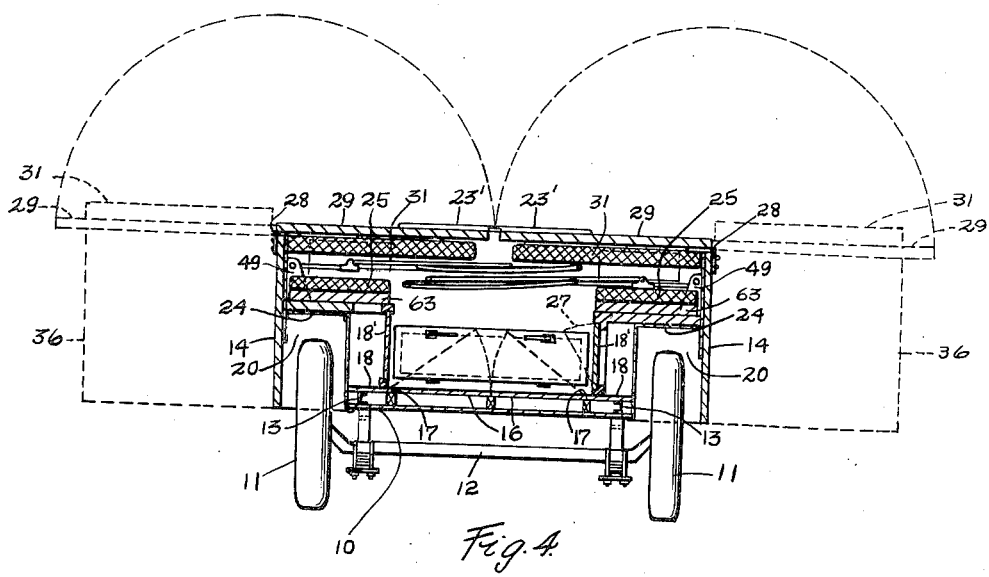
Fig. 4 is a vertical sectional detail view of the same.

The side walls of the cabinet 14 have hinged thereto as at 33 supporting plates 36 which are adapted to be swung into the position shown in dotted lines (Fig. 4) when the cover sections 29 are pivoted to the position as shown in dotted lines (Fig. 4).

The refrigeration compartments 23 are normally closed by hinged covers 23'. The forward end portion of the cabinet 14 provides a hitch 39 of any approved construction which will facilitate connection to the rear end of an automobile and which hitch provides a positioning leg 40 for supporting the forward end portion of the cabinet 14 when serving for camping facilities, the leg 40 being movable vertically relative to the hitch 39 for engagement with the ground.

The rear end portion of the cabinet 14 provides an adjustable jack 41 which, when in the position shown in dotted lines, Fig. 5, serves to support the rear end of the cabinet 14 during camping service.

As shown in Fig. 3, doors 42 may be hingedly secured as at 43 to open communication with the forward compartments 26 for storage purposes. Fig. 9 is a detail view of the gate construction and while this may be of any approved construction, yet we prefer to provide the gate in two sections, 44 and 45, hinged together as at 46, with the lower section 45 hinged to the chassis as at 47, whereby when the tail gate is disposed in the position shown in dotted lines in Fig. 9, the section 44 will serve as a step to facilitate stepping into the trailer. When in the position shown in full lines in Fig. 9, the tail gate effectively closes the rear opening 48 of the cabinet 14.

Mounted in the cabinet 14 are mounting brackets 49. To these brackets 49 are pivotally secured, as at 50, the limb portions 51 of parallel, substantially U-shaped frames 52 which, when in the position shown in Fig. 10, are arranged in parallel relation with respect to each other. As shown in Fig. 7, there is provided on each of the limb portions 51 a coupling 53 to which is pivotally connected as at 54 a side frame bar 55 substantially U-shaped and adapted to extend at an angle with respect to the frame 52. Pivotally connected as at 56 to the top frame 52 is a frame member 57. Over this frame construction is adapted to be led a canvas or otherwise fabricated or waterproofed covering with side walls to complete an enclosure over the cabinet 14.

In the preferred form of construction as shown in Figs. 11 to 15 inclusive, the ends 58 of this covering are secured by any suitable means to the edge portions 59 of the cover sections 29 for reasons which will be understood hereinafter.

The bed as embodied in the preferred form of construction shown in the accompanying drawings, comprises a bed along each side of the trailer beneath the cover structure 60, which cover structure 60 may be provided with suitable windows 61. Each of these bed constructions comprises, as before stated, a mattress comprising two sections, one indicated at 31 and the other at 25. The mattress section 31 is secured in any suitable manner, as before stated, to the cover section 29. The mattress section 25 is adjustable vertically with respect to the boards 24, and this is accomplished in the manner shown in Fig. 8, wherein it will be noted that I provide a flat metal pan 63 adapted to be disposed upon the boards 24. Over this pan is positioned the mattress section 25. At the opposite ends of the pan 63 there are pivotally secured, as at 64, supporting legs 65 limited in their pivotal movement in one direction by limiting pins 66.

The arrangement is such that when the cover sections are pivoted to the position shown in dotted lines, Fig. 4, the mattress sections 31 will be disposed on top of these cover sections 29. Therefore, to bring the mattress section 25 up to the same plane as the mattress section 31, it is only necessary to elevate the pan 63 with the mattress section 25 therein and support the pan 63 by means of the legs 65 resting upon the board 24. In this manner, a complete mattress is provided for sleeping purposes.

In Figs. 11 to 15 inclusive, I have illustrated schematically the manner of collapsing the frame structure and the cover therefor. Referring to Fig. 11, and a reference to Fig. 10, the first operation is to collapse the frame 55. This is done by pivoting the frame bar 55 to a position substantial parallel with the frame 52. This pivotal movement will flex the cover section heretofore held in taut condition by the frame bar 55. The next operation is to pivot the frame 57 downwardly to a position parallel with the frame 52. At the completion of this operation the frame 52 is pivoted to a position provided by the cabinet 14, as shown at 66'. The covering section, as these frames are collapsed together, is tucked and folded in, the manner shown in Figs. 11 to 14, the cover in such folded or collapsed condition resting partly upon the top section 29 and within the cabinet 14. The next operation is to swing the top section 29 from the position shown in dotted lines, Fig. 4, to the full line position shown in Fig. 15, with the cover of the trailer top completely concealed therebeneath and protected from the elements of the weather.

When the cover is in distended position and in order to render the same substantially taut, we provide in the ends 67 of the frame 57, connecting pegs 68 which may be in the form of elongated round rod sections, the ends of which telescope in the ends of the frame 57, thus not only securely connecting these frames together, but also tending to stretch the cover to maintain the same in taut condition. To complete the invention there may be disposed over the door opening 69 a suitable drop cover or canvas (not shown).

From the foregoing, it will be seen that a trailer constructed in accordance with the foregoing description is substantially simple in construction, compact when in collapsed condition, and durable and strong when in extended position. It will also be obvious that the top or cover section of the trailer may be distended and collapsed by simple operations without any undue exertion or effort on the part of the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A vehicle of the class described in which there is a body portion providing a storage compartment and side panels providing a cover for the storage compartment and hinged thereto for positioning in a horizontal plane laterally of the body portion, a flexible cover for said body portion having its long edges connected to the outer edges of said panels and adapted when collapsed to be disposed in a folded condition within the storage compartment beneath said panels when said panels are disposed over said storage compartment, a collapsible supporting structure for said flexible cover comprising two confronting sections each comprising a frame bar substantially U-shaped in side elevation with end portions pivotally connected to the body portion, means providing said pivotal connection, a top bar substantially U-shaped in plan view and pivotally connected to the frame bar, a side bar substantially U-shaped in side view and pivotally connected to the frame bar, said side bar and said top bar being adapted to be positioned parallelly with respect to the frame bar and said frame bar with said side bar and top bar disposed in said parallel relation with respect thereto being adapted to be pivoted to a position within said storage compartment beneath said flexible cover when the latter is disposed in said compartment.

2. A vehicle of the class described in which there is a body portion providing a storage compartment and side panels providing a cover for the storage compartment and hinged thereto for positioning in a horizontal plane laterally of the body portion, a flexible cover for said body portion having its long edges connected to the outer edges of said panels and adapted when collapsed to be disposed in a folded condition within the storage compartment beneath said panels when said panels are disposed over said storage compartment, a collapsible supporting structure for said flexible cover comprising two confronting sections each comprising a frame bar substantially U-shaped in side elevation with end portions pivotally connected to the body portion, means providing said pivotal connection, a top bar substantially U-shaped in plan view and pivotally connected to the frame bar, a side bar substantially U-shaped in side view and pivotally connected to the frame bar, said side bar and said top bar being adapted to be positioned parallelly with respect to the frame bar and said frame bar with said side bar and top bar disposed in said parallel relation with respect thereto being adapted to be pivoted to a position within said storage compartment beneath said flexible cover when the latter is disposed in said compartment, the end portion of the top bar of one of said sections being disposed in abutment with the end portion of the top bar of other of said sections when said top bars are in cover supporting position with respect to said flexible cover, and means for detachably connecting said abutting end portions together.

WILLIAM B. MacDONALD, Jr.

REFERENCES CITED

The following references are of record in the file of this patent:

UNITED STATES PATENTS

| Number | Name | Date |
|---|---|---|
| 1,484,522 | Moore | Feb. 19, 1924 |
| 1,564,257 | Lippman | Dec. 8, 1925 |
| 1,887,272 | Larsen | July 12, 1932 |
| 2,152,713 | Stewart | Apr. 4, 1939 |
| 2,309,242 | Dumelin | Jan. 26, 1943 |

FOREIGN PATENTS

| Number | Country | Date |
|---|---|---|
| 29,574 | Australia | Oct. 15, 1930 |
| 191,287 | Great Britain | Jan. 11, 1923 |
| 675,799 | France | Nov. 8, 1929 |